May 14, 1957  E. H. MONKLEY  2,791,895
APPARATUS FOR VARYING THE TORQUE AND SPEED OF A DRIVEN SHAFT
Filed Feb. 12, 1954

INVENTOR.
EDWARD H. MONKLEY
BY
Chas. R. Jay
atty.

United States Patent Office 2,791,895
Patented May 14, 1957

2,791,895

APPARATUS FOR VARYING THE TORQUE AND SPEED OF A DRIVEN SHAFT

Edward H. Monkley, Worcester, Mass.

Application February 12, 1954, Serial No. 409,955

10 Claims. (Cl. 64—30)

This invention relates to an automatic constant tension control having means for automatically increasing or decreasing the output torque to the rotating roll for any material which is being wound or unwound, as the diameter of the roll changes, but the present invention has for its principal object the provision of means for so changing the output torque to the roll according to the rotation of the shaft rotating the roll and predetermined as to the amount of change of torque by reason of the particular material being processed and not merely in accordance with the changing diameter of the roll.

Other objects of the invention include the provision of a device as above stated including a roll winding or output shaft driven through a slip or friction clutch, the pressure upon which is constantly changed by means of a travelling head, which head is moved according to the rotation of the shaft; in combination with means for increasing the pressure on the friction clutch and causing the same to act in the manner of a brake in cases where relatively high pressure is exerted on the same due to the large roll diameter, the general operation being that the more the head moves, the greater the pressure is exerted on the clutch, but in some cases this pressure may not be sufficient to maintain the desired tension on the web; and the provision of means as above described for increasing the pressure on the slip clutch, so that when the operator stops the machine, the slip clutch will not cause over-running which may happen in cases of large roll diameters in the ordinary operation of the machine according to my copending application, Serial No. 325,495 filed December 11, 1952.

Other objects and advantages of the invention will appear hereinafter.

Figure 1:
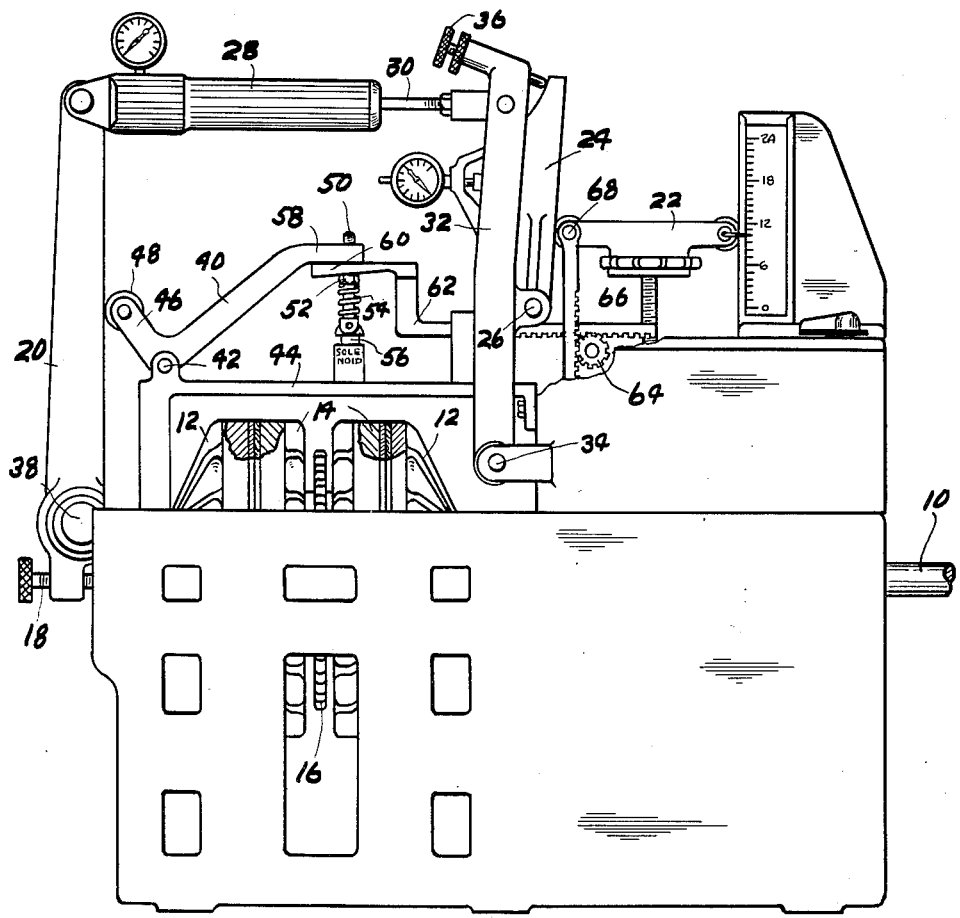
Figure 2:
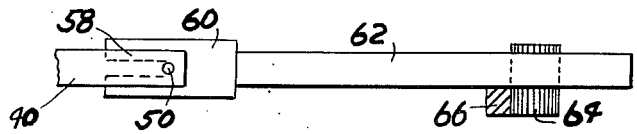

Reference to the drawing, Figure 1 is a view in elevation showing the invention; and Fig. 2 is a top plan view of the wedge cam and rack.

As fully described in my copending application, there is a main roll shaft 10 which is driven by a slip clutch not herein shown in detail but conforming to that disclosed in my copending case and herein generally indicated at 12, 14. The clutch element 14 is positively driven by means of a sprocket, pulley or gear 16 from a motor, and the clutch part 14 drives the clutch parts 12 under pressure exerted by the adjusting screw 18 on the lever 20. This arrangement rotates the shaft 10 to wind or unwind a roll but the pressure on the clutch is constantly changed according to the progression or travel of a head 22 also driven by shaft 10 by any means desired, and as it travels, moving a pivoted cam arm 24 pivoted at 26. This cam arm constantly increases the pressure in a cylinder 28 by means of a rod 30, all as described in my copending application.

It will be seen that as shaft 10 is rotated under influence of a clutch, the head 22 travels and increases the pressure on the friction clutch in such a way as to provide for automatic constant tension control on the web that is being wound or unwound. The lever 32 moves the rod 30 directly and in turn is moved by arm 24 as described, arm 32 being pivoted at 34 in a fixed position, the arm 24 being pivoted on arm 32.

The arm 24 is adjustable by means of a screw 36 so that the tension on the clutch may be varied according to the material being processed. Arm 20 is pivoted at the fixed point 38 so that as arm 20 is moved in a counter-clockwise direction, the thumb-screw 18 will exert increasing pressure on the slip clutch element 12.

When the roll diameter reaches a relatively large measurement, and it is desired to stop the machine at the end of the process, it sometimes happens that inertia of the roll causes stopping motion of shaft 10 to be relatively slow, and the purpose of the present invention is primarily to provide for quicker stopping in the event that over-running is encountered. In general, the higher the head 22 travels, the greater pressure is needed to stop the roll from rotating.

To this end there is provided a kind of bell-crank 40 pivoted at 42 to a bracket 44. This bell-crank has a short arm 46 provided with a roller 48 which bears against an edge of arm 20 in such a way as to tend to thrust the latter counterclockwise. The long arm of the bell-crank 40 is provided with a hole through which extends a pivoted rod 50, there being a nut 52 on said rod. This nut is made adjustable on the rod to tension a spring 54 mounted on a solenoid element 56, so that the rod 50 may be thrust upwardly upon operation of the solenoid.

Between the end 58 of the bell-crank 40 and the nut 52 and embracing rod 50, there is a wedge 60 which may be in the form of a yoke embracing rod 50 and frictionally engaged upon the under side of the end portion 58 of bell-crank 40. This wedge is secured to a rack 62 in mesh with a spur gear 64, in turn connected to a rack 66 pivoted at 68 to the head 22.

The operation of this device is that as head 22 rises, rack 66 also rises and rotates the spur gear 64 in a clockwise direction, and this in turn moves rack 62 and wedge 60 to the right. The wedge 60 then increasingly forces the bell-crank 40 in a counterclockwise direction, increasing the pressure on the lever 20 in a counterclockwise direction and increasing the pressure on the slip clutch. Therefore, as the roll diameter being wound on shaft 10 increases, there is extra pressure provided on the slip clutch, so that when the motive power for the slip clutch is stopped, the clutch will not tend to slip and allow the inertia of the wound roll to over-run the driven portion of the clutch 14.

In addition, when the operator stops the motive power (which ordinarily will be an electric motor), the solenoid is energized to exert a sudden upward thrust on the long part of the bell-crank to thereby exert an additional sudden thrust on the lever 20, imparting an additional pressure on to the parts of the slip clutch to enhance the operation of the wedge 60 as above described.

Having thus described my invention and the advantages thereof, I do not wish to be limited to the details herein disclosed, otherwise than as set forth in the claims, but what I claim is:

1. Apparatus for varying the torque and speed of a driven shaft comprising a base, a shaft thereon, a variable pressure friction clutch driving the shaft, means to vary the pressure on said friction clutch, said means comprising a movable head element driven from said shaft, an arm connected to the clutch, means engageable by said head element effective to move said arm to increase the pressure on the friction clutch, and separate means engageable with said arm to tend to move the same in the same direction to further increase the pressure thereon.

2. Apparatus for varying the torque and speed of a driven shaft comprising a base, a shaft thereon, a variable pressure friction clutch driving the shaft, means to vary the pressure on said friction clutch, said means comprising a movable head element driven from said shaft, an arm connected to the clutch, means engageable by said head element effective to move said arm to increase the pressure on the friction clutch, and separate means engageable with said arm to tend to move the same in the same direction to further increase the pressure thereon, said separate means including a cam and means to move the cam from the head.

3. Apparatus for varying the torque and speed of a driven shaft comprising a base, a shaft thereon, a variable pressure friction clutch driving the shaft, means to vary the pressure on said friction clutch, said means comprising a movable head element driven from said shaft, an arm connected to the clutch, means engageable by said head element effective to move said arm to increase the pressure on the friction clutch, and separate means engageable with said arm to tend to move the same in the same direction to further increase the pressure thereon, said separate means including a cam and means to move the cam from the head, said cam being in the form of a wedge.

4. Apparatus for varying the torque and speed of a driven shaft comprising a base, a shaft thereon, a variable pressure friction clutch driving the shaft, means to vary the pressure on said friction clutch, said means comprising a movable head element driven from said shaft, an arm connected to the clutch, means engageable by said head element effective to move said arm to increase the pressure on the friction clutch, separate means engageable with said arm to tend to move the same in the same direction to further increase the pressure thereon, and a solenoid having a core operable to urge said separate means to engage the arm.

5. The apparatus of claim 4 wherein the said separate means includes a movable wedge, and the solenoid acts abruptly upon the wedge, providing a fast operation for the separate means.

6. Apparatus for varying the torque and speed of a driven shaft comprising a base, a shaft thereon, a variable pressure friction clutch driving the shaft, means to vary the pressure on said friction clutch, said means comprising a movable head element driven from said shaft, an arm connected to the clutch, means engageable by said head element effective to move said arm to increase the pressure on the friction clutch, and separate means engageable with said arm to tend to move the same in the same direction to further increase the pressure thereon, said separate means including a cam and means to move the cam from the head, to relatively slowly cause the separate means to operate, and operator operated means to cause an abrupt increase of pressure on the arm.

7. Apparatus for varying the torque and speed of a driven shaft comprising a shaft, a slip clutch to drive the same, a pivoted arm varying the slip clutch pressure, a movable head, a wedge movable as the head moves, means to increase the pressure on the arm, said wedge operating the said means as the head moves, and means to vary the wedge position relative to the arm.

8. Apparatus for varying the torque and speed of a driven shaft comprising a shaft, a slip clutch to drive the same, a pivoted arm varying the slip clutch pressure, a movable head, a wedge movable as the head moves, means to increase the pressure on the arm, said wedge operating the said means as the head moves, and means to vary the wedge position relative to the arm, said pressure increasing means including a bell-crank, the wedge acting on one leg thereof and the other leg impinging upon the arm.

9. The apparatus of claim 8 including a variable spring exerting resilient pressure on the wedge against the bell-crank.

10. Apparatus for varying the torque and speed of a driven shaft comprising a shaft, a slip clutch to drive the same, a pivoted arm varying the slip clutch pressure, a movable head, a wedge movable as the head moves, means to increase the pressure on the arm, said wedge operating the said means as the head moves, and means to vary the wedge position relative to the arm including a solenoid and a core therefor for exerting an instantaneous pressure increase on the wedge and on the arm.

References Cited in the file of this patent

UNITED STATES PATENTS

| | | |
|---|---|---|
| 1,399,988 | Pierce | Dec. 13, 1921 |
| 2,123,744 | Ramsey | July 12, 1938 |
| 2,214,901 | Griffin | Sept. 17, 1940 |
| 2,252,419 | Slaughter | Aug. 12, 1941 |
| 2,680,573 | Monkley | June 8, 1954 |